Nov. 28, 1950   L. J. WURDINGER   2,531,867
BERRY VINE HOLDER
Filed Oct. 11, 1948
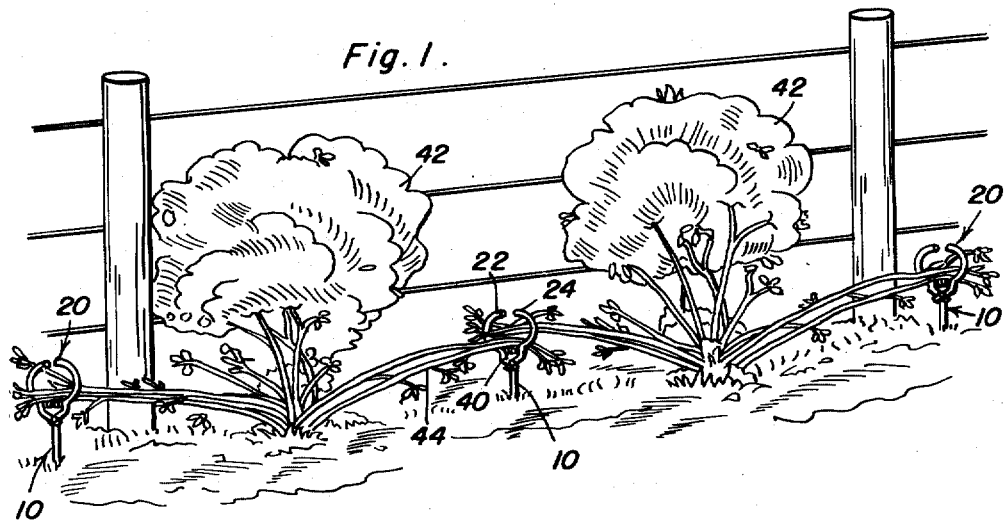
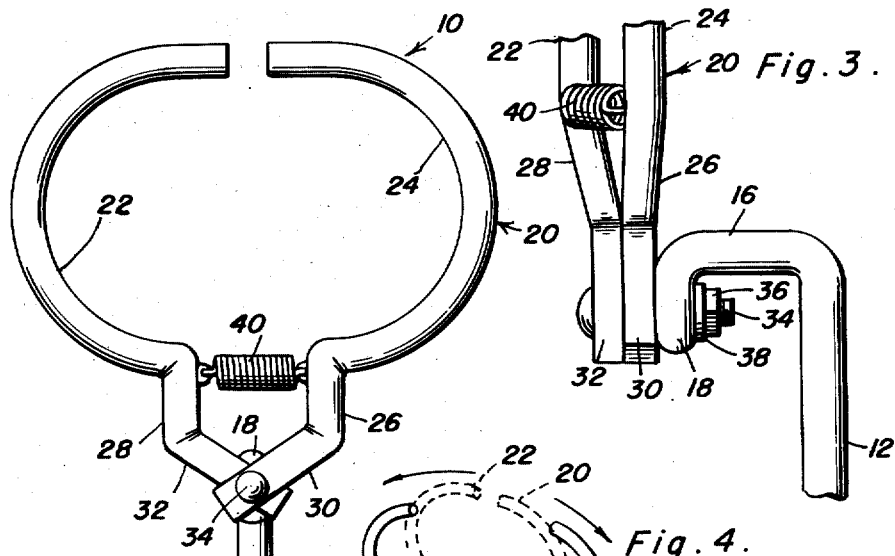
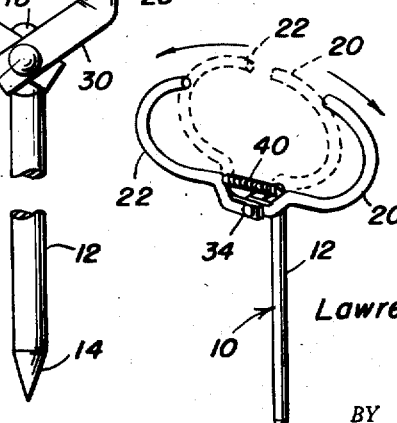
Lawrence J. Wurdinger
INVENTOR.

Patented Nov. 28, 1950

2,531,867

UNITED STATES PATENT OFFICE 2,531,867

BERRY VINE HOLDER

Lawrence J. Wurdinger, Mount Angel, Oreg.

Application October 11, 1948, Serial No. 53,888

2 Claims. (Cl. 47—47)

This invention relates to new and novel improvements in devices for supporting plants, vines, flowers and the like and has for its primary object to retain the sprawling branches of small shrubs and the stalks of vines and other growing plants out of engagement with the ground so that the ground beneath the branches and stalks can be easily cultivated or otherwise worked.

A meritorious feature of this invention resides in the provision of a supporting stake to the upper end of which is pivotally attached a plant engaging section including a pair of arcuately configurated commonly pivoted members.

Another meritorious feature of this invention resides in the provision of means for normally retaining the plant engaging complementary members in a closed position to prevent accidental opening of the complementary sections and to thereby avoid accidental removal of the branches or stalks.

These and ancillary objects and other meritorious features are attained by this invention, a preferred embodiment of which is set forth in the following description and illustrated in the accompanying drawings, wherein:

Figure 1 is a view in perspective of a plurality of plant supporting devices constructed in accordance with the principles of this invention, the same being operatively shown in association with shrubs or small trees;

Figure 2 is a front elevational view of one of the plant engaging members;

Figure 3 is an enlarged side elevational view of a fragmentary portion of the device, and;

Figure 4 is a view in perspective of one of the plant supporting devices, illustrating the same in an open position and depicting the same in a closed dotted line position.

Referring now more particularly to the drawings, this invention generally designated by the character reference 10 includes a supporting stake or member 12 the lower portion of which terminates in a bared point 14 for insertion in the soil near the growing plants. The supporting stake is provided at its upper end with a lateral extension 16 terminating in a downwardly disposed end 18, the latter being positioned parallel with the main portion of the supporting stake.

The downwardly turned portion 18 of the supporting stake is adapted to pivotally support a plant engaging section 20, which includes a pair of arcuately configurated complementary sections 22 and 24. The plant engaging members or sections 22 and 24 are provided with laterally extending offset portions 26 and 28, which terminate nate in angular extensions 30 and 32. The angular extensions 30 and 32 are commonly pivoted to the depending section 18 of the supporting stake by means of a pivot pin or bolt 34 which is inserted through the angular extensions or supporting sections 30 and 32 and through the depending section 18 of the supporting stake. Of course, a locking bolt 36 and a spacing washer or bushing 38 are provided to secure the bolt or pin 34 to the foregoing members.

Means is provided for maintaining the complementary plant engaging arcuate sections 22 and 24 in a normally closed position about the branches or stalks of a bush or plant and includes a spring 40 which is secured between the lateral extensions 26 and 28 of the arcuate members.

With respect to Figure 1 in the drawings, the utility of this device can be appreciated, wherein a plurality of the plant supporting devices are shown in operative association with shrubs 42 having extending or crawling branches 44. The supporting stake 12 is driven into the ground and the plant engaging devices are thereby disposed in a vertical position. The complementary arcuate sections 20 and 22 are moved about their pivot point and the branches or stalks 44 are disposed therein, the spring 40 functioning to urge or return the sections into a closed position and to thereby hold the branches or stalks within the supporting devices.

Thus, it can be seen that there is provided a very light and extremely useful device, which constitutes an efficient support for a cluster of plants, branches of vines and which is capable of other similar and analogous uses.

However, since other purposes and uses of this device will become apparent and since further embodiments can be carried out, it is to be understood that limitation is only sought within the scope and spirit of the appended claims.

Having described the invention, what is claimed as new is:

1. A vine holder comprising a complementary pair of rigid arcuate holders having laterally extending flanges formed on one of their ends, a spring connected between said flanges for yieldingly retaining the holders in closed relation, offset ends on said flanges, said ends lying in intersecting planes and disposed in overlapping relation, a pivot element transversely disposed through the ends, a rigid supporting stake having a lower end adapted to be driven in the ground and an offset upper end, said pivot element being fastened to the upper end whereby the holders are commonly pivoted on the supporting stake and are biased together by the spring.

2. A vine holder comprising a rigid supporting stake having a lower end adapted to be driven into the ground, a laterally projecting extension on the upper end of the stake, a depending flange on said extension, a pair of rigid complementary holders, said holders having parallel laterally projecting flanges, a spring connected between said flanges, offset ends on said flanges, said ends being arranged in overlapping relation and a pivot element disposed through said ends and fastened to the flange on the stake extension.

LAWRENCE J. WURDINGER.

REFERENCES CITED

The following references are of record in the file of this patent:

UNITED STATES PATENTS

| Number | Name | Date |
|---|---|---|
| 1,693,393 | Lapolla | Nov. 27, 1928 |

FOREIGN PATENTS

| Number | Country | Date |
|---|---|---|
| 169,617 | Great Britain | Oct. 6, 1921 |